(12) United States Patent
Solomon et al.

(10) Patent No.: US 10,384,961 B2
(45) Date of Patent: *Aug. 20, 2019

(54) HIERARCHICAL POROUS MEMBRANE FOR EMULSION SEPARATION

(71) Applicant: Massachusetts Institute of Technology, Cambridge, MA (US)

(72) Inventors: Brian Richmond Solomon, Rockville, MD (US); Kripa K. Varanasi, Lexington, MA (US); Nasim Hyder, Somerville, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 390 days.

This patent is subject to a terminal disclaimer.

(21) Appl. No.: 13/781,601

(22) Filed: Feb. 28, 2013

(65) Prior Publication Data
US 2013/0240447 A1  Sep. 19, 2013

Related U.S. Application Data

(60) Provisional application No. 61/604,421, filed on Feb. 28, 2012.

(51) Int. Cl.
| | | |
|---|---|---|
| *B01D 71/50* | (2006.01) | |
| *B01D 71/42* | (2006.01) | |
| *B01D 71/82* | (2006.01) | |
| *B01D 69/02* | (2006.01) | |
| *C02F 1/44* | (2006.01) | |
| *B01D 69/10* | (2006.01) | |
| *B01D 17/00* | (2006.01) | |
| *C02F 1/40* | (2006.01) | |
| *B01D 67/00* | (2006.01) | |
| *B01D 71/68* | (2006.01) | |

(Continued)

(52) U.S. Cl.
CPC .............. *C02F 1/44* (2013.01); *B01D 17/085* (2013.01); *B01D 69/02* (2013.01); *B01D 69/10* (2013.01); *B01D 71/42* (2013.01); *B01D 71/50* (2013.01); *B01D 67/0034* (2013.01); *B01D 67/0093* (2013.01); *B01D 71/68* (2013.01); *B01D 2325/022* (2013.01); *B01D 2325/04* (2013.01); *B01D 2325/38* (2013.01); *C02F 1/40* (2013.01); *C02F 1/444* (2013.01); *C02F 2101/32* (2013.01); *C02F 2101/325* (2013.01); *C10G 33/06* (2013.01)

(58) Field of Classification Search
None
See application file for complete search history.

(56) References Cited

U.S. PATENT DOCUMENTS 5,051,182 A * 9/1991 Wang .................. B01D 17/085
                                                210/500.27
5,670,051 A * 9/1997 Pinnau et al. ................ 210/651
(Continued)

*Primary Examiner* — Clare M Perrin
(74) *Attorney, Agent, or Firm* — Steptoe & Johnson LLP

(57) ABSTRACT

Hierarchical porous membranes suitable for use in oil/water separation processes are provided. The membranes described herein are particularly well suited for separating trace amounts of water (e.g., no greater than 3 wt % water content, no greater than 1 wt % water content, or 50-1000 ppm water) from oil. The membranes have a wide range of applications, including deep seep oil exploration, oil purification, and oil spill cleanup.

9 Claims, 14 Drawing Sheets

(51) Int. Cl.
*C10G 33/06* (2006.01)
*C02F 101/32* (2006.01)

(56) References Cited

U.S. PATENT DOCUMENTS

| | | | |
|---|---|---|---|
| 6,355,081 B1* | 3/2002 | Wang | B01D 39/083 |
| | | | 428/391 |
| 7,350,427 B2* | 4/2008 | Sandra et al. | 73/863.23 |
| 7,854,846 B2* | 12/2010 | Goldsmith et al. | 210/650 |
| 2007/0125702 A1* | 6/2007 | Ramaswamy et al. | 210/490 |
| 2009/0241496 A1* | 10/2009 | Pintault | C23C 4/11 |
| | | | 55/524 |

\* cited by examiner

HIERARCHICAL POROUS MEMBRANE FOR EMULSION SEPARATION

CROSS-REFERENCE TO RELATED APPLICATION

This application claims priority to and the benefit of, and incorporates herein by reference in its entirety, U.S. Provisional Patent Application No. 61/604,421, filed Feb. 28, 2012.

TECHNICAL FIELD

This invention relates generally to articles and methods for separating emulsions. More particularly, in certain embodiments, a hierarchical porous membrane is provided for separating oil and water.

BACKGROUND

Separation of oil and water mixtures is of great importance across a wide range of technologies and industries. For example, oil and water separation problems gained national attention during the 2010 Gulf oil spill and subsequent cleanup efforts. The petroleum industry faces similar water and oil separation challenges as it attempts to extract oil from beneath the sea.

Existing separation devices and methods are either environmentally unfriendly, extremely energy intensive, or incapable of performing the desired separations. For example, in deep sea oil extraction, one energy-intensive approach is to pump oil emulsified in water from the ocean floor to the surface where it is stored it in gravity separation tanks. Unfortunately, once much of the water has been removed from the oil, existing techniques (e.g., ultracentrifugation) are incapable of removing additional, trace amounts of water that remain. These trace amounts of water in oil may cause problems for end users, process equipment, and machinery. Current separation techniques are therefore inefficient and incapable of performing the wide range of oil and water separations of interest.

There is a need for more efficient devices and methods for separating oil and water mixtures. In particular, a need exists for separating trace amounts of water from oil and water mixtures.

SUMMARY OF THE INVENTION

Various embodiments of the invention provide a hierarchical porous membrane for separating emulsions of oil and water. In principle, the membrane may be applied to the separation of any two immiscible liquids. Unlike existing separation techniques, the membrane and methods described herein may be used to separate trace amounts of water (e.g., no greater than 3 wt % water content, no greater than 1 wt % water content, or 50-1000 ppm water) from oil. By altering properties of the membrane (such as pore size, hydrophobicity, and layer length), parameters critical to operation can be controlled, such as the breakthrough pressure and permeability. The membrane has a wide range of applications, including deep seep oil exploration, oil purification, and oil spill cleanup.

In one aspect, the invention relates to a hierarchical porous membrane suitable for use in oil/water separation processes. The membrane: (i) includes a polymer; (ii) is oleophilic; (iii) is hydrophobic; (iv) has a first layer with small pores; and (v) has a second layer, wherein the second layer is a support layer that is substantially thicker than the first layer and that has substantially larger pores than the first layer.

In certain embodiments, the first layer has thickness from about 0.3 micron to about 2 microns or from about 0.5 to about 2.0 microns. In one embodiment, the first layer has average pore size from about 25 nm to about 300 nm, from about 50 nm to about 200 nm, or from about 100 nm to about 150 nm. The support layer preferably has thickness from about 55 microns to about 370 microns. The support layer may have average pore size from about 10 microns to about 25 microns.

In certain embodiments, the first layer include a coating. The coating may be a silane coating. The silane coating may include at least one member selected from the group consisting of octadecyltrichlorosilane (OTS), methylsilane, phenylsilane, isobutylsilane, dimethylsilane, tetramethyldisilane, hexylsilane, octadecylsilane, and fluorosilane.

In certain embodiments, the polymer is selected from the group consisting of polycarbonate, polysulfone (PSf), polyacrylonitrile (PAN), polyethersulfone (PES), and any combination thereof. In certain embodiments, the membrane includes polycarbonate and wherein the membrane has a coating comprising octadecyltrichlorosilane (OTS).

In another aspect, the invention relates to a method of performing an oil/water separation. The method includes: (a) providing an initial liquid stream or volume including oil and water; (b) passing the initial liquid stream or volume through the membrane, described above, thereby allowing the passage of the oil from the initial stream or volume through the membrane and inhibiting the flow of the water from the initial stream or volume through the membrane; and (c) collecting fluid passing through the membrane, wherein the fluid that has passed through the membrane has water concentration less than the initial liquid stream or volume.

In certain embodiments, initial liquid stream or volume has water concentration no greater than 3 wt % or no greater than 1 wt %. In certain embodiments, initial liquid stream or volume has water concentration from about 50 ppm to about 1000 ppm. In one embodiment, the fluid that has passed through the membrane has water concentration no greater than about 30 ppm.

In another aspect, the invention relates to a method of preparing a hierarchical porous membrane (e.g., the membrane described above) suitable for use in an oil/water separation process (e.g., the method described above). The method includes: (a) combining a polymer, a pore former, and a solvent to make a polymer solution; (b) casting the polymer solution on a plate (e.g., glass plate); (c) following step (b), immersing the plate in a non-solvent to allow release of air bubbles; and (d) optionally, cutting a layer of the membrane resulting from step (c) to undergo coagulation, thereby forming the hierarchical porous membrane.

In certain embodiments, the polymer is selected from the group consisting of polycarbonate, polysulfone (PSf), polyacrylonitrile (PAN), polyethersulfone (PES), and any combination thereof. The solvent preferably includes dimethyl acetamide (DMAc) and/or n-methyl-2-pyrrolidone (NMP). In one embodiment, the pore former includes poly(vinylpyrrolidone) (PVP), polyethylene glycol (PEG), or a mixture thereof. The non-solvent may be DI water or a mixture of water and an alcohol. For example, the non-solvent may be a mixture of water and ethanol. In various embodiments, the non-solvent is a mixture of no less than about 50 wt. % water and no greater than about 50 wt. % alcohol (e.g., ethanol). In one embodiment, the non-solvent is a mixture of about 90 wt. % water and about 10 wt. % alcohol (e.g., ethanol). The method may also include the step of performing plasma etching to remove at least a portion of a first layer of the membrane.

Elements of embodiments described with respect to a given aspect of the invention may be used in various embodiments of another aspect of the invention. For example, it is contemplated that features of dependent claims depending from one independent claim can be used in apparatus and/or methods of any of the other independent claims.

BRIEF DESCRIPTION OF THE DRAWINGS

The objects and features of the invention can be better understood with reference to the drawing described below, and the claims.

DESCRIPTION

It is contemplated that articles, apparatus, methods, and processes of the claimed invention encompass variations and adaptations developed using information from the embodiments described herein. Adaptation and/or modification of the articles, apparatus, methods, and processes described herein may be performed by those of ordinary skill in the relevant art.

Throughout the description, where articles and apparatus are described as having, including, or comprising specific components, or where processes and methods are described as having, including, or comprising specific steps, it is contemplated that, additionally, there are articles and apparatus of the present invention that consist essentially of, or consist of, the recited components, and that there are processes and methods according to the present invention that consist essentially of, or consist of, the recited processing steps.

It should be understood that the order of steps or order for performing certain actions is immaterial so long as the invention remains operable. Moreover, two or more steps or actions may be conducted simultaneously.

The mention herein of any publication, for example, in the Background section, is not an admission that the publication serves as prior art with respect to any of the claims presented herein. The Background section is presented for purposes of clarity and is not meant as a description of prior art with respect to any claim.

Figure 1:
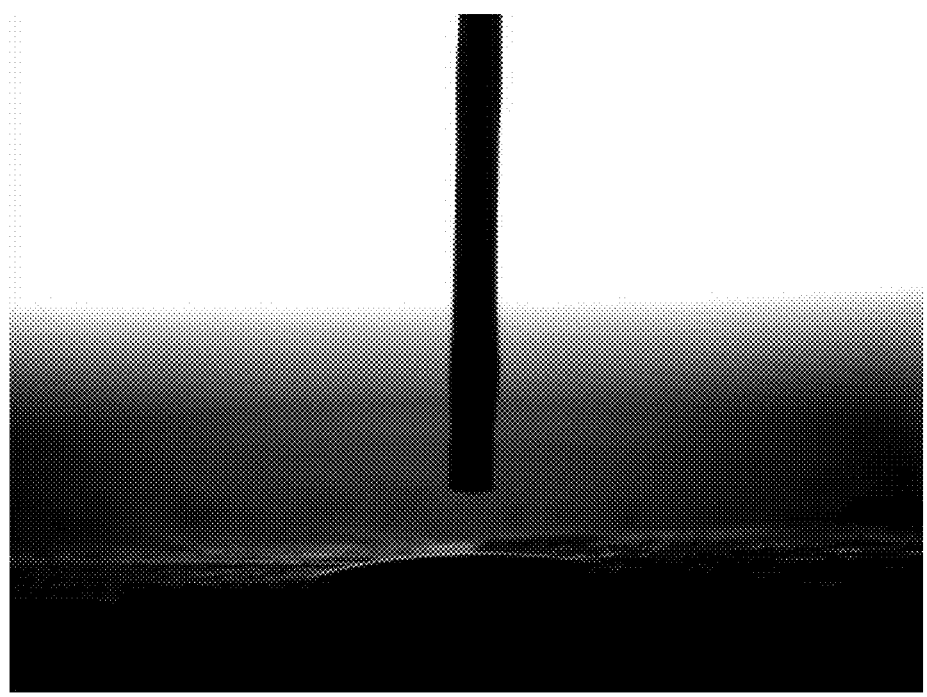
FIG. 1 is a photograph of an oil film on a membrane surface, in accordance with an illustrative embodiment of the invention.

Referring to FIG. 1, in certain embodiments, a membrane is provided that is naturally oleophilic (e.g., it is spontaneously wetted by oil) and hydrophobic (e.g., it repels water droplets). This useful property allows oil to pass through the membrane and water to be blocked or stopped. In one embodiment, the ability of the membrane to separate oil and water is due at least in part to the membrane's structure. As depicted, oil wets the membrane to form a barely visible thin film.

Figure 2:
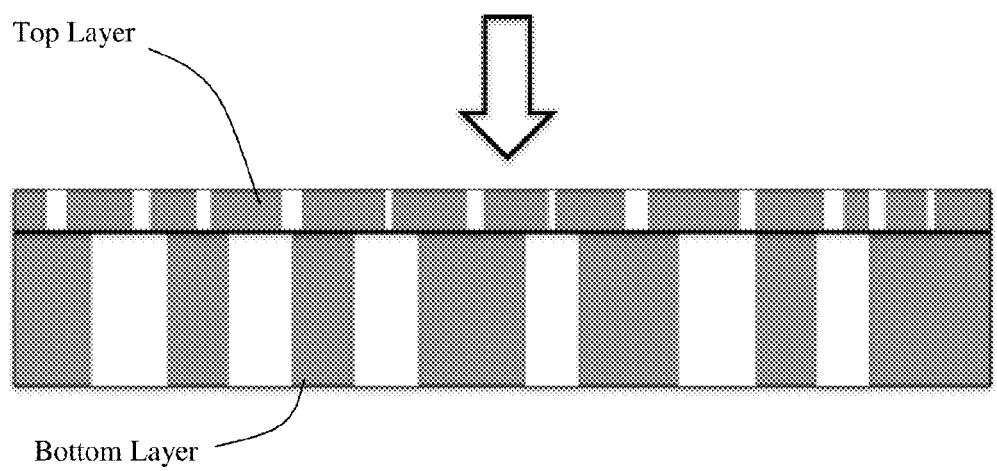
FIG. 2 is a schematic cross-sectional view of a membrane, in accordance with an illustrative embodiment of the invention.
Figure 3A:
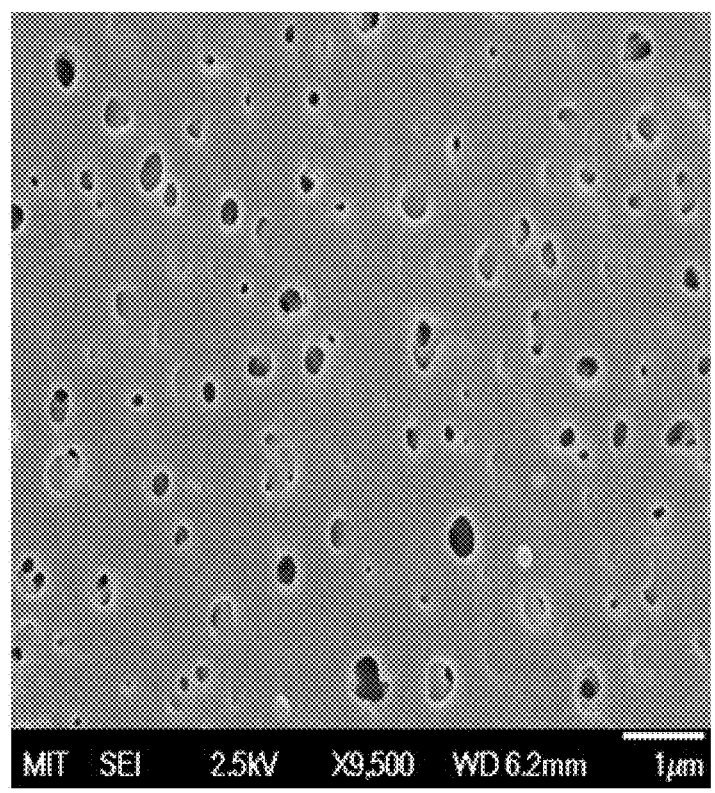
FIG. 3a is an SEM image of a top surface of a membrane, in accordance with an illustrative embodiment of the invention.
Figure 3B:
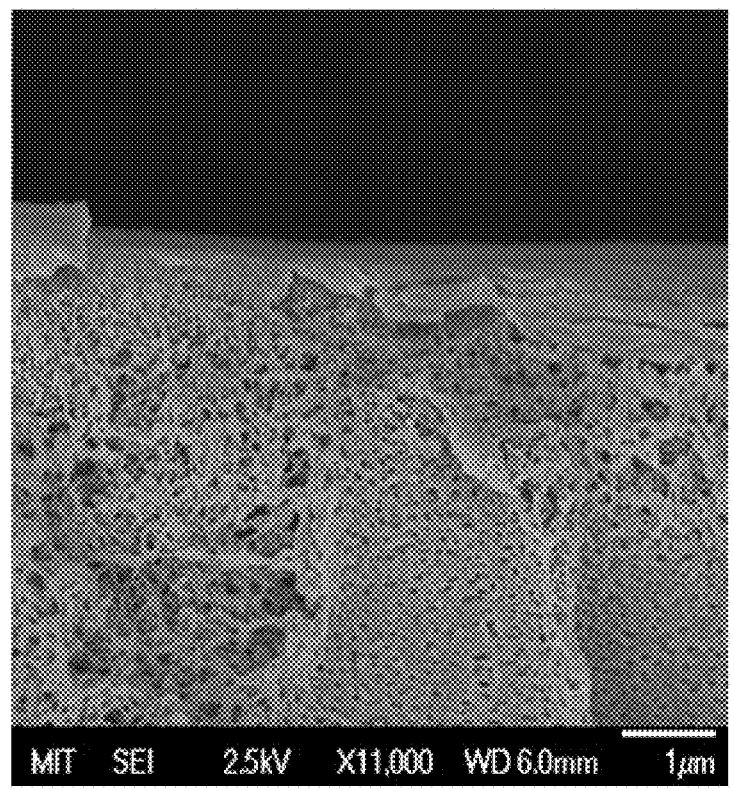
FIG. 3b is an SEM image of a cross-section of a membrane, in accordance with an illustrative embodiment of the invention.

Referring to FIGS. 2, 3a, and 3b, in certain embodiments, the membrane is about 120 μm thick and includes a top layer and a bottom layer. The top layer has a thickness $l_1$ and includes a plurality of small pores having a diameter from about 300 nm to about 500 nm. The bottom layer has a thickness $l_2$ and includes a plurality of large pores having a diameter from about 10 μm to about 50 μm. As depicted in FIG. 2, the membrane is designed for an emulsion to flow down through it, from the top layer to the bottom layer. The SEM images in FIGS. 3a and 3b show the nanoscale or small pores on a top surface of the top layer and the microscale or large pores just below the surface (in the bottom layer).

While not wishing to be bound by a particular theory, to understand how the membrane operates, consider water in contact with the top surface of the membrane. The Young-Laplace equation states that the pressure difference $p_c$ across the surface in question in given by $$p_c = \frac{2\gamma \cos\theta}{r}, \qquad (1)$$

where γ is the surface tension of water, θ is the contact angle for water, and r is the pore radius. For the hydrophobic membrane, θ for water is greater than 90° and, accordingly, there is a positive pressure difference $p_c$ across the top surface that prevents the water from entering the pores. If this pressure difference is overcome, water may spontaneously enter the pores. In certain embodiments, the pressure necessary to force water to enter the pores of the membrane is referred to as the breakthrough pressure.

In various embodiments, the breakthrough pressure is controlled by varying the pore radius r. For example, a smaller pore radius r results in a higher breakthrough pressure. In addition, in one embodiment, the membrane is chemically treated to alter the contact angle for water θ.

While the hydrophobic properties of the membrane prevent the passage of water, in various embodiments, the oleophilic properties of the membrane cause oil to wet the membrane and enter the pores of the membrane spontaneously. While again not wishing to be bound by a particular theory, Darcy's law is a phenomenologically derived equation that describes fluid flow through porous media:

$$Q = \frac{-kA}{\mu} \frac{\Delta p}{L}. \qquad (2)$$

In this equation, Q is the volumetric flowrate of the fluid, k is the permeability of the membrane, A is the surface area of the membrane, μ is the viscosity of the fluid, L is the thickness of the membrane, and Δp is the pressure difference across the membrane.

In certain embodiments, to maximize the flowrate of oil through the membrane, the permeability k and/or the pressure difference Δp are kept high, and/or the thickness L is kept low. To prevent the flow of water through the membrane, the pressure preferably does not exceed the breakthrough pressure.

In various embodiments, the membrane allows for the key parameters (e.g., breakthrough pressure and flowrate) to be systematically controlled. The methodology for controlling these parameters is summarized in Table 1.

TABLE 1

Key parameters for membrane.

| Property | Modify by | Positive Effects On | Negative Effects On |
| --- | --- | --- | --- |
| Decrease r | Controlling pore size | Breakthrough pressure | Permeability, flow rate |
| Increase θ | Chemical treatment | Breakthrough pressure | |
| Decrease $l_1$ | Membrane fabrication | Permeability | |
| Increase $l_2$ | Membrane fabrication | Stability | |

In some embodiments, membrane fabrication is bound by certain physical limits. For example, from a permeability standpoint, it would be preferable to make $l_1$ infinitely thin. In general, the easiest parameter of the membrane to influence or control is the pore radius r. Pore radius r, however, is coupled to both breakthrough pressure and permeability k. For example, in certain embodiments, the breakthrough pressure is inversely proportional to the radius r of the pores. At the same time, changing the radius r changes the permeability k. Fine-tuning the membrane may therefore be a delicate process.

Both breakthrough pressure and flowrate Q influence the separation efficiency of the membrane. In certain embodiments, the separation efficiency is defined as the flow of oil through the membrane divided by the total flow through the membrane. It is desirable to fine-tune the membrane to achieve the best flowrate possible.

In certain embodiments, a hierarchical porous polysulfone (PSf) membrane is manufactured using a phase inversion process (e.g., immersion precipitation). The method uses the following ingredients: a polymer (e.g., polysulfone (PSf) or polyacrylonitrile (PAN)); a solvent (e.g., organic, such as Dimethyl acetamide (DMAc) or n-methyl-2-pyrrolidone (NMP)); a non-solvent (e.g., DI water or a mixture of water/ethanol:90/10); and a pore former (e.g., poly(vinylpyrrolidone) (PVP) or Poly ethylene glycol (PEG) or a mixture of PVP/PEG (50/50)). The method includes dissolving the polymer in the solvent to produce a mixture, casting the mixture on a glass plate, and immersing the glass plate and mixture in a water bath to initiate phase inversion (also called immersion precipitation) to get the membrane films. During the phase inversion process, PVP and/or PEG creates macro pores. In general, a lower polymer concentration or addition of PEG creates bigger pores in the top layer.

In one embodiment, a porous polysulfone (PSf) membrane is prepared using a phase inversion technique based on a non-solvent induced phase separation method. A mixture of 7 g PSF and 3 g poly(vinylpyrrolidone) (PVP) is dissolved in 40 mL DMAc at 80° C. to form a homogeneous solution, which is then left at 50° C. for 12 h to allow air bubbles to be released. Using a doctor blade knife or other cutting instrument, a thin layer (0.28 mm) of polymer solution is then casted on a glass plate which is then immersed into non-solvent water at room temperature (22° C.), to undergo coagulation. Phase separation of the polymer-solvent system takes place during this process, which creates an asymmetric microporous membrane matrix. To wash away the PVP additive completely, the porous membrane is then rinsed with running tap water for 24 h, followed by immersion in a glycerol-water solution (volume ratio of 1:1) for another 24 h, before being dried at ambient conditions.

In various embodiments, polyacrylonitrile (PAN) porous membranes are prepared in a similar fashion. Compared to PSf, PAN is generally less hydrophobic (contact angle with water is 71°, compared to 84° for PSf) and usually results in bigger pores on the surface.

In various embodiments, PVP and/or PEG are used as pore forming chemicals to create uniform arrays of macropores. Without PVP and/or PEG, the formation of macropores may be random, and the quality of the membrane microstructure may be poor.

In certain embodiments, the addition of a water and alcohol (e.g., ethanol) mixture in the bath makes the non-solvent less polar and can delay the mixing of solvent (DMAc) and the non-solvent (water and ethanol). In one embodiment, this creates a membrane where the top layer pore sizes are in the scale of 50 to 300 nm, due to delayed mixing.

In certain embodiments, the top layer of the membrane has a thickness $l_1$ from about 0.3 microns to about 1 micron (e.g., as determined from cross-sectional scanning electron microscopy of the membrane film). In one embodiment, the top layer (also referred to as the active layer) provides the separation efficiency or selectivity of the membrane. As mentioned, the top layer includes the small pores (e.g., nanopores). In one embodiment, a pore diameter of the top layer is from about 25 nm to about 300 nm. The pore size may increase gradually from the top surface of the membrane to the inner structure.

In various embodiments, the bottom layer has a thickness $l_2$ from about 55 microns to about 370 microns (e.g., as determined from cross-sectional scanning electron microscopy of the membrane film). In one embodiment, the bottom layer provides mechanical support and gives negligible resistance to permeability, due to the large pores (e.g., macropores). In one embodiment, a pore diameter in the bottom layer is from about 10 microns to about 25 microns. The pore size may increase gradually toward the inner structure.

To form the top and bottom layers, in certain embodiments, the PSf polymer solution is cast as a film on a glass plate with a casting knife. The film is then immersed into a coagulation bath containing water. At the moment of immersion, DMAc diffuses out of the film, while water diffuses into the film. Because PSf is immiscible with the water, and has a relatively high molecular weight and a low diffusion coefficient, a relative velocity of the PSf molecules is very low. Diffusion therefore takes place in a polymer frame of reference. As a result of instantaneous or near-instantaneous demixing, two phases result in the glass plate. In one embodiment, a first phase that is poor (lean) in polymer creates macropores for the bottom layer, and a phase that is rich in polymer creates nanopores for the top layer, for selective separation.

Figure 4:
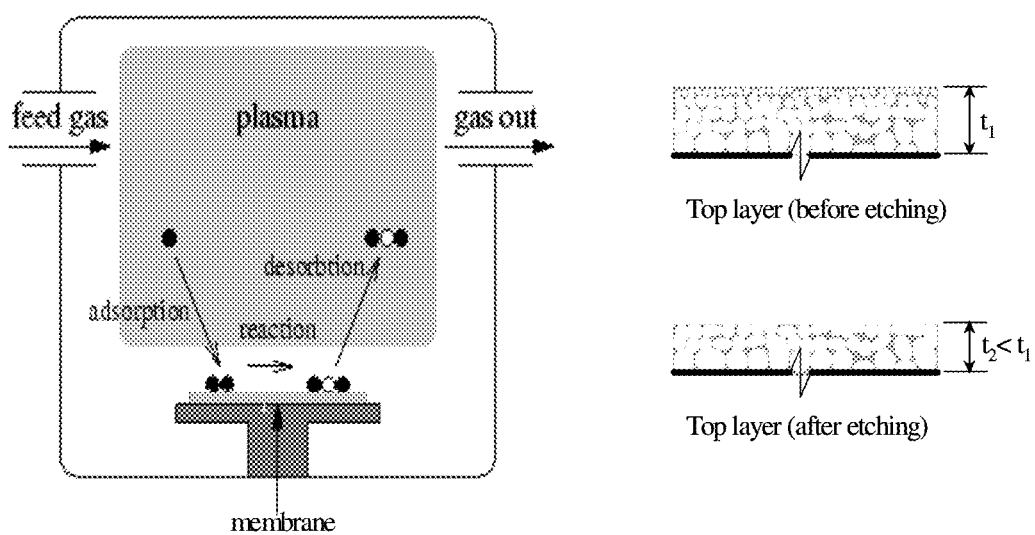
FIG. 4 includes a schematic front view of a plasma etching process, in accordance with an illustrative embodiment of the invention.

In certain embodiments, to improve the permeability of the PSf and/or PAN hierarchical membranes, selective or plasma etching of the top layer (e.g., where the pore sizes are 30-300 nm) is performed. The plasma etching is preferably performed in an $O_2$ (oxygen) plasma chamber in a vacuum (200 mbar), for a controlled etching time of 3 to 10 seconds. FIG. 4 is a schematic of a plasma etching process, in accordance with certain embodiments of the invention. The plasma etching removes part of polymer material from the top layer surface, thereby decreasing an effective thickness of the top layer and opening up bigger pores (e.g., with size greater than 80 nm) beneath the original surface. The plasma etching process may be helpful to increase the overall permeability of the membrane.

In certain embodiments, the membranes and methods described herein are used to remove water from oil when the water concentrations are too low to be separated with conventional devices. For example, when the water concentration is higher than 0.5% by volume in the oil-water mixture, traditional separation devices (e.g., an ultracentrifuge) may be used. However, for trace amount of water (e.g., no greater than 3 wt % water content, no greater than 1 wt % water content, or 50-1000 ppm water), these traditional separation devices may be incapable of separating the water from the oil. Advantageously, for these trace amounts, the hierarchical porous membranes described herein may be used to perform the separation. In one embodiment, these membranes have a have high affinity for oil (contact angle less than 10°) and a low affinity for water (contact angle of about 84°). In various embodiments, PSf is the polymer used to form the hierarchical porous structure suitable for the separation of low concentrations (e.g., on the order of ppm) of water from oil.

The membranes and methods have several applications in the petroleum industry. For example, the membranes and methods may be used to remove trace amounts of water from oil to obtain higher oil concentrations and improve the performance of machines that use the oil (e.g., combustion engines). The petroleum industry faces similar difficulties as it turns to the sea floor for oil extraction. Previous separation methods used for these purpose are either environmentally unfriendly or extremely energy intensive. For example, one separation method includes pumping oil emulsified in water from the sea floor to the sea surface and storing the emulsion in gravity separation tanks. Pumping the complete emulsion to the surface requires substantially more power than pumping the oil alone. Hence, the methods and membranes described herein may be used to separate oil and water more effectively at the source. Once separated, the oil can be pumped to the surface for further purification.

The membranes and methods have additional applications, across many different industries. For example, the membranes and methods may be used to collect oil following an oil spill, such as the 2010 Gulf oil spill. The membranes and methods may also be used to clean water contaminated with oil before the water is released to the environment or reused. For example, the membranes and methods may be used to separate oil from the bilge water accumulated in ships, as required by the international MARPOL Convention.

EXAMPLE 1

A porous polysulfone (PSf) membrane was prepared using a phase inversion technique based on a non-solvent induced phase separation method. A mixture of 7 g PSF and 3 g poly(vinylpyrrolidone) (PVP) was dissolved in 40 mL DMAc at 80° C. to form a homogeneous solution, which was then left at 50° C. for 12 h in order for air bubbles to be released. Using a doctor blade knife, a thin layer (0.28 mm) of polymer solution was then casted on a glass plate which was then immersed into non-solvent water at room temperature (22° C.), to undergo coagulation. During this process, phase separation of the polymer-solvent system took place, which created an asymmetric microporous membrane matrix. To wash away the PVP additive completely, the porous membrane was then rinsed with running tap water for 24 h, followed by immersion in a glycerol-water solution (volume ratio of 1:1) for another 24 h, before being dried at ambient conditions.

A micrometer was used to determine the composite membrane thickness by measuring at least 10 different locations, including the center. The thicknesses of the selective layers were determined from a cross-sectional SEM image analysis. The thickness (dry) of the membrane was 120±10 µm, as measured by a micrometer and later verified by SEM image analysis.

Referring again to the SEM images of FIGS. 3*a* and 3*b*, the phase inversion process created a porous polysulfone structure. As depicted, the PSf membrane includes pores of different sizes, ranging from about 100 nm to about 10 µm in diameter. The asymmetric membrane shows hierarchical porous morphology, with interconnected small pores on the surface that span a thickness of 300-500 nm, and large pores (10-50 µm) below. The dissolving of PVP in water accelerates the initial separation of polymer and solvent to form the large pores.

Figure 5:
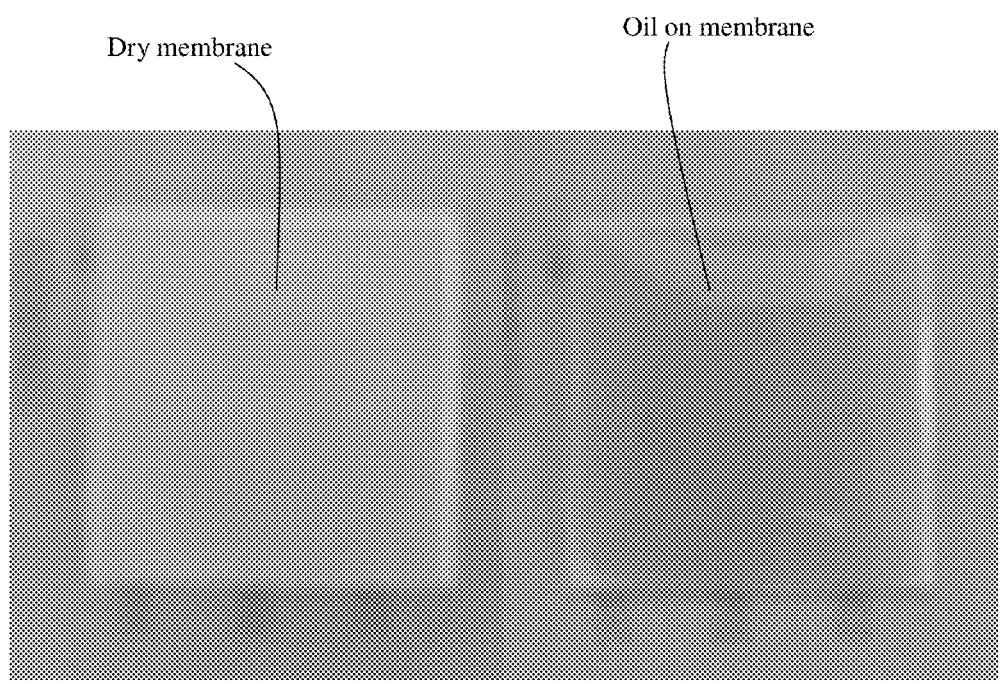
FIG. 5 includes photographs of a dry membrane and a membrane wetted by oil, in accordance with an illustrative embodiment of the invention.

To demonstrate the membrane's ability to readily wet with oil, mineral oil dyed with nile red was applied to the membrane. Referring to FIG. 5, it is clear that the oil easily wets the membrane.

In general, the stability of an oil-in-water emulsions is strongly affected by the chain length of the oil (hexadecane is better than decane). Emulsions may be prepared using a variety of methods including but not limited to sonication, freeze-pump-thaw cycles, or mechanical mixing.

Separation experiments were performed with an emulsion of water (e.g., MILLI-Q water) and oil (hexadecane). To form the emulsion, a mixture of water and hexadecane (2:1, by volume) was mechanically nebulized using a 26 gauge needle. The emulsion was allowed to settle for about 30 minutes so that macroscopic hexadecane could physically separate and rise to the top of the emulsion. The stability of the emulsion was monitored visually over a 24 hour period, enough time needed to run the membrane experiments. In general, the mixture should maintain a cloudy, turbid appearance, indicating that the emulsion remains intact. An optical microscope may be used to quantify the mechanically dispersed emulsions (hexadecane particles may be on the order of 10 microns in diameter). To determine a weight percent of dispersed hexadecane, 1 ml aliquots of the emulsion may be placed on a thin microscope slide and the water may be allowed to evaporate from the microscope slide. The weight percent is then determined from the difference between the initial mass (with water) and the final mass (no water). The final volume ratio (water to hexadecane) of the emulsions may be reported for separation testing based on the residual mass measurements. Surfactant free hexadecane-in-water emulsions have been shown to be stable for longer than 24 hours, as compared to similar suspensions of decane-in-water (e.g., stable only for about 3 hours).

Figure 6:
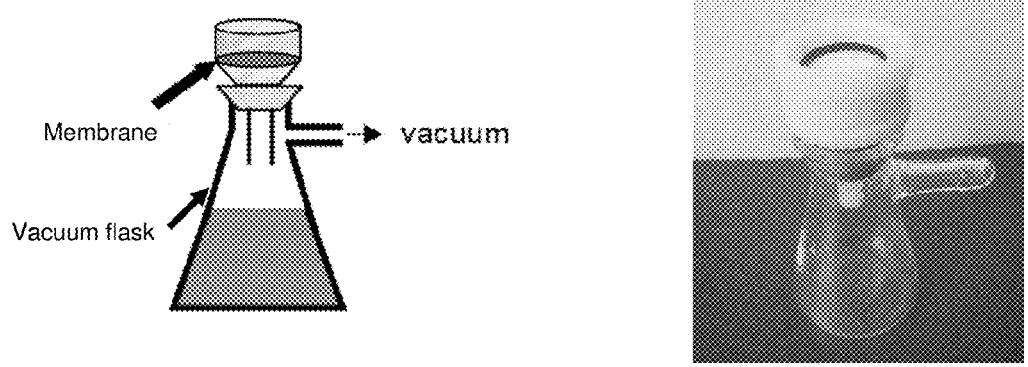
FIG. 6 includes a schematic diagram and a photograph of a device for performing oil and water separation experiments.

FIG. 6 depicts a device for performing laboratory separations of oil/water emulsions, in accordance with one embodiment of the invention. The device includes a membrane holder having a Teflon holder along with a vito o-ring, to ensure good sealing of the membrane against any pressure loss. The holder is connected to a vacuum flask with a rubber adapter. The vacuum flask is connected to a vacuum line. To perform a separation experiment, a vacuum of 10 to 14 psi may be applied and the time for a fixed volume of liquid to transport across the membrane may be recorded.

The device may be used to determine membrane permeability. For example, the time for 20 ml of water to pass through a known membrane area may be recorded. For bulk fluid flow measurements, a filtration setup is used with the membrane and sealed (e.g., using adhesive). The membranes and tubes are checked for leaks around the seal, ensuring that all fluid flow occurs only through the membrane. A pressure gauge or vacuum may be used to regulate the pressure across the membrane. In general, the pressure/vacuum is chosen such that 5-20 ml (depending on filtration setup, membrane) of water passes through a membrane during 2 to 10 minutes. Next, flow rates for water are measured. The tubes and membranes are then dried under vacuum, and the flow rate for hexadecane is measured.

In certain embodiments, membranes are tested for selectivity to determine their ability to separate water-hexadecane. Using the device, the emulsions are gravity fed through the membrane. The emulsions are injected directly into the membrane-tube setup. The fluid that passed through the membrane is then collected in a pre-weighed vial. The residual hexadecane in the vial is isolated by allowing the water to evaporate overnight. Next, the mass of the residual hexadecane is measured to determine the percentage of hexadecane that had been retained by the membrane.

EXAMPLE 2

Without wishing to be bound by a particular theory, provided a the droplet radius is larger than the pore diamater, a droplet will breakthrough the membrane at pressures exceeding the breakthroguh pressure, $P_B$, which may be expressed as follows:

$$P_B = \frac{2\gamma_{WO} \cos \theta_{OW}}{r_p} \quad (3)$$

where $P_B$ is the breakthrough pressure, $\gamma_{OW}$ is the interfacial energy between water and oil, $\theta_{WO}$ is the contact angle of a water droplet on the membrane surface in a background of oil, and $r_p$ is the Pore radius of the membrane.

Accordingly, in order to achieve maximum rejection of water droplets, the transmembrane pressure $P_t$ must be kept below the breakthrough pressure. The relavant interface here is the interface between oil and water. The membrane should be more wetting to oil than water in order to achieve permeation of the oil phase.

Without wishing to be bound by any particular theory, when considering two immiscible phases 1 and 2, it is found that complete rejection of phase 2 and permeation of phase 1 results if two conditions are met. First, the minimum droplet size of phase 2 must be larger than the maximum pore size of the membrane. Second, phase 1 must wet the membrane more than phase 2.

(i)

$$r_{2,min} > r_{pore,max} \quad (4)$$

(ii)

$$\gamma_2(\sqrt{\gamma_S^{LW}\gamma_1^{LW}}+\sqrt{\gamma_S^+\gamma_1^-}+\sqrt{\gamma_S^-\gamma_1^+}) > \gamma_1(\sqrt{\gamma_S^{LW}\gamma_2^{LW}}+\sqrt{\gamma_S^+\gamma_2^-}+\sqrt{\gamma_S^-\gamma_2^+}) \quad (5)$$

wherein $r_{2,min}$ is the minimum drop radius of dispersed phase 2, $r_{p,max}$ is the maximum pore radius of the membrane, $\gamma_1$ is surface tension of phase 1, $\gamma_2$ is surface tension of phase 2, $\gamma_S^{LW}$ is Lifshitz-van der Waals parameter of the surface free energy of the membrane, $\gamma_1^{LW}$ is Lifshitz-van der Waals parameter of the surface free energy of phase 1, $\gamma_2^{LW}$ is Lifshitz-van der Waals parameter of the surface free energy of phase 2, $\gamma_S^+$ is Lewis acid parameter of surface free energy of the membrane, $\gamma_1^+$ is Lewis acid parameter of surface free energy of phase 1, $\gamma_2^+$ Lewis acid parameter of surface free energy of phase 2, $\gamma_S^-$ is Lewis base parameter of surface free energy of the membrane, $\gamma_1^-$ is Lewis base parameter of surface free energy of phase 1, and $\gamma_2^-$ is Lewis base parameter of surface free energy of phase 2.

Figure 7:
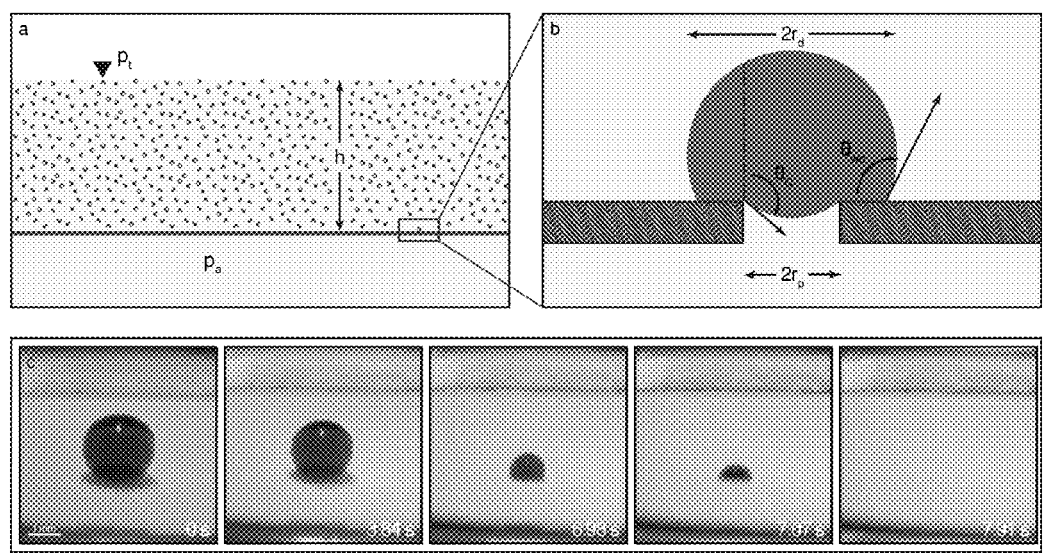
FIG. 7 includes a schematic illustration and a series of photographs of a coated polycarbonate membrane, in accordance with an illustrative embodiment of the invention.

FIG. 7 shows a) a schematic of a water/oil (w/o) emulsion being filtered through a membrane; b) a close-up diagram of a rejected droplet on the surface of the membrane; and c) frames from a video showing a 2 mm diameter droplet breakthrough a 600 nm OTS coated polycarbonate membrane.

Figure 8:
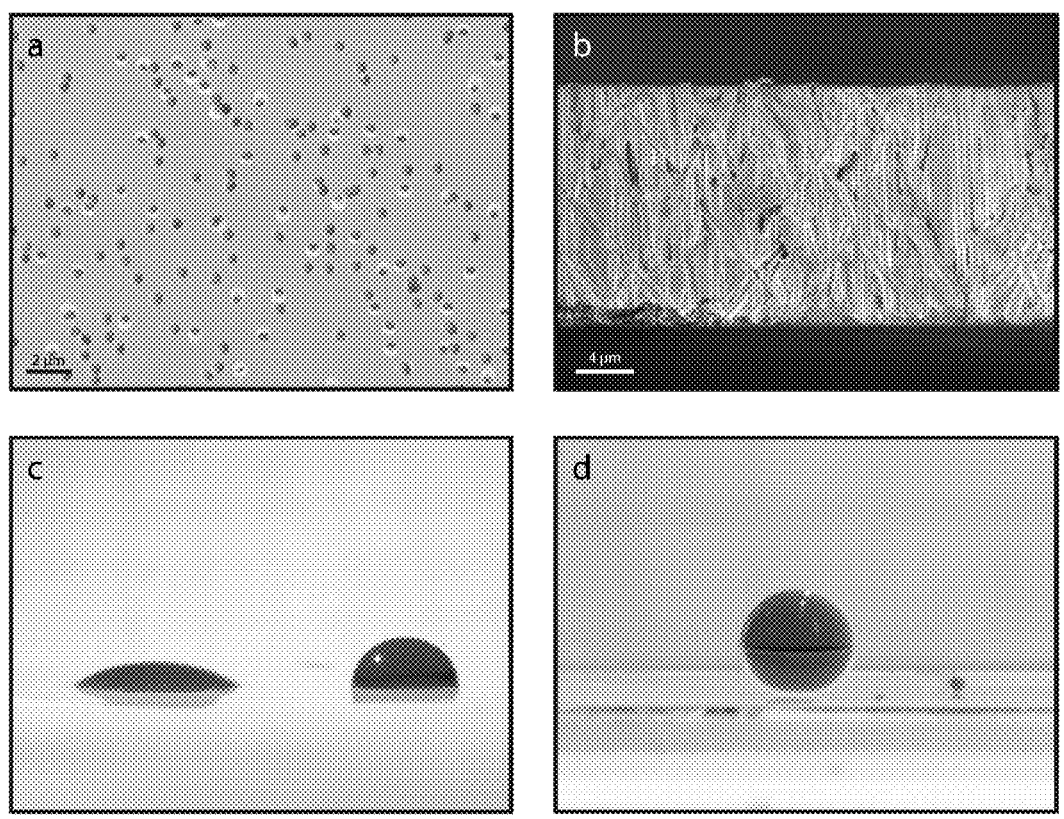
FIG. 8 includes SEM images and photographs of a coated polycarbonate membrane, in accordance with an illustrative embodiment of the invention.

In FIG. 8, SEM images of an OTS-coated 600 nm polycarbonate membrane show a) the coated top side and b) the cross section. FIG. 8c shows that in air, the membrane is oleophilic (hexadecane dyed red) and hydrophobic (water dyed red). FIG. 8d shows that when submerged in hexadecane, the membrane surface is much more hydrophobic.

To demonstrate the operation of membranes capable of filtering w/o emulsions, two polycarbonate membranes of pore sizes 600 nm and 100 nm were coated with octadecyl-trichlorosilane (OTS). These membranes were prepared via the track-etch method. The membranes are prepared by exposing polycarbonate films to ion bombardment followed by a chemical etch. The pores sizes are tightly distributed around the reported values. Furthermore, the pores have regular cylindrical geometries.

Figure 9:
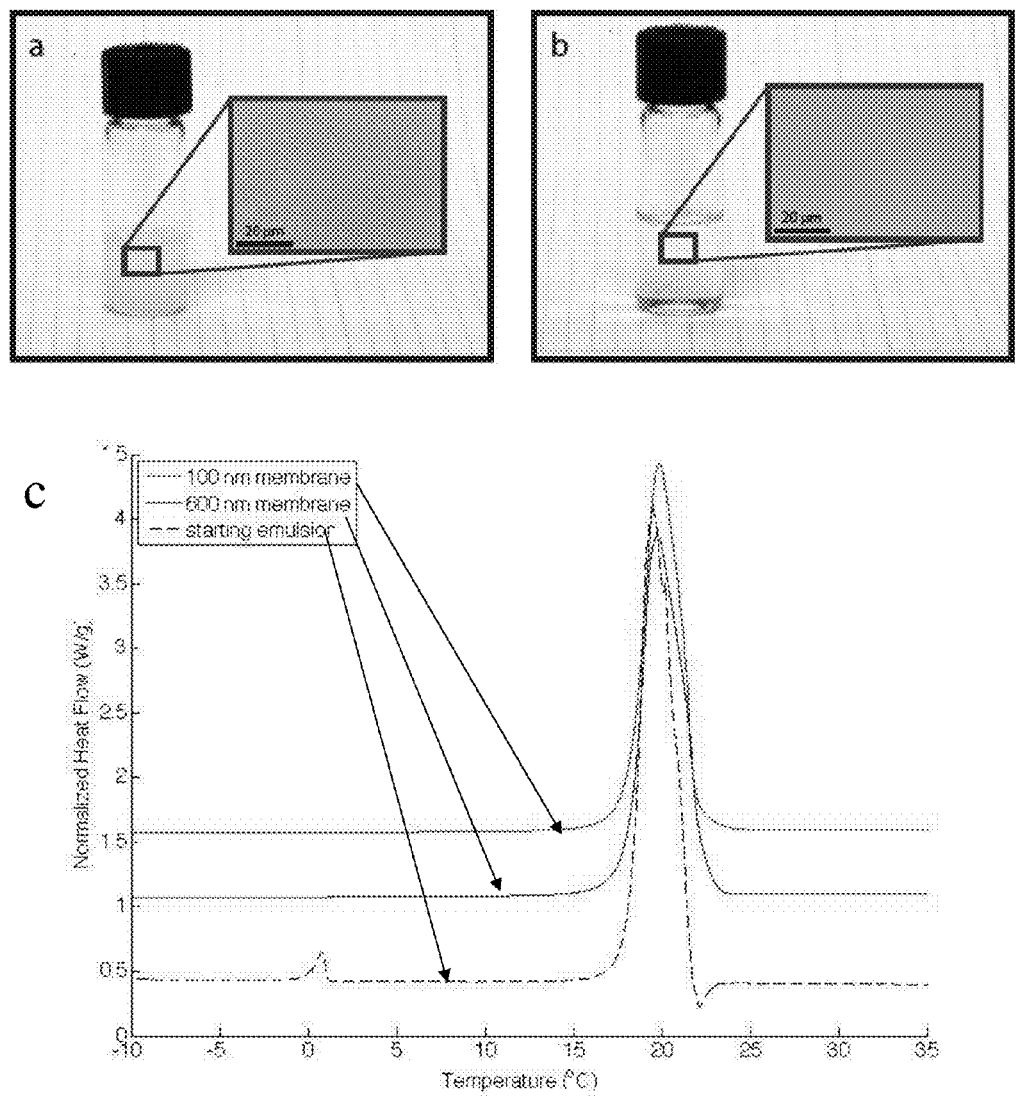
FIG. 9 includes a macroscopic photo and a microscopic photo demonstrating filtration of emulsions through coated polycarbonate membranes, in accordance with an illustrative embodiment of the invention.

FIG. 9 shows a macroscopic photo and a microscopic photo of a 3 wt % w/o emulsion stabilized by Span 80 a, before filtration and b, filtered through a 600 nm OTS coated PC membrane at a transmembrane pressure below the breakthrough pressure. FIG. 9c shows DSC data for the emulsion before filtration, filtered through a 600 nm OTS coated PC membrane, filtered through a 100 nm OTS coated PC membrane, as well as data for pure water and hexadecane with Span 80.

The membranes were tested by applying a transmembrane pressure below the calculated breakthrough pressure. With both membranes, the permeate was visually clear. Microscopy revealed that water droplets (mean size ~1.5 µm) were not in the permeate. The differential scanning calorimetry (DSC) results demonstrate that the permeate samples had very low water content.

Figure 10:
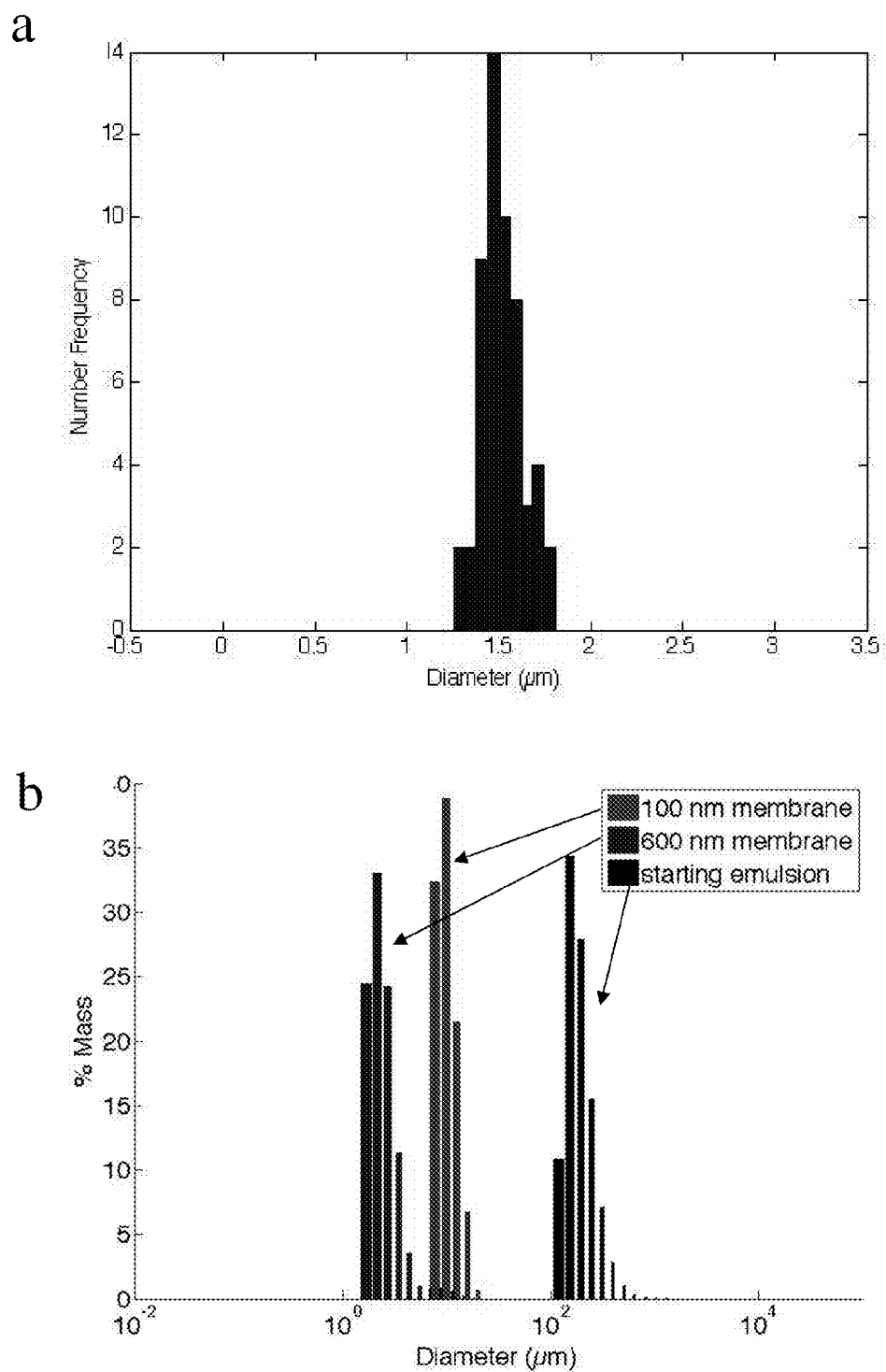
FIG. 10 includes diagrams showing distribution of water droplets on membranes used in accordance with an illustrative embodiment of the invention.

FIG. 10 shows a, Distribution of droplets in the pre-filtered emulsion and b, DLS data for the pre-filtered emulsion and permeates. Image analysis gives the distribution of water droplets in the pre-filtered emulsion. Dynamic light scattering (DLS) is used to characterize the distribution of droplets smaller than 1 µm. The pre-filtered emulsion has droplets around 100 nm while the size of droplets in both permeate samples is on average less than 10 nm.

While the 600 nm membrane and 100 nm membrane seem to perform similarly, the distribution data (particularly the DLS) should demonstrate that the 100 nm membrane filters out even the particles<600 nm.

EXAMPLE 3

This Example demonstrates decreasing the skin layer thickness of the membrane while retaining its pore sizes. This results in a membrane exhibiting the same rejection characteristics but better permeabilities. Table 2 summarizes that membranes we have synthesized.

TABLE 2

Skin thickness for membranes.

| PSf concentration | PEG concentration | Skin thickness (µm) |
|---|---|---|
| 100% | 0% | 1.7 |
| 95% | 5% | 1.6 |
| 90% | 10% | 0.8 |

Figure 11:
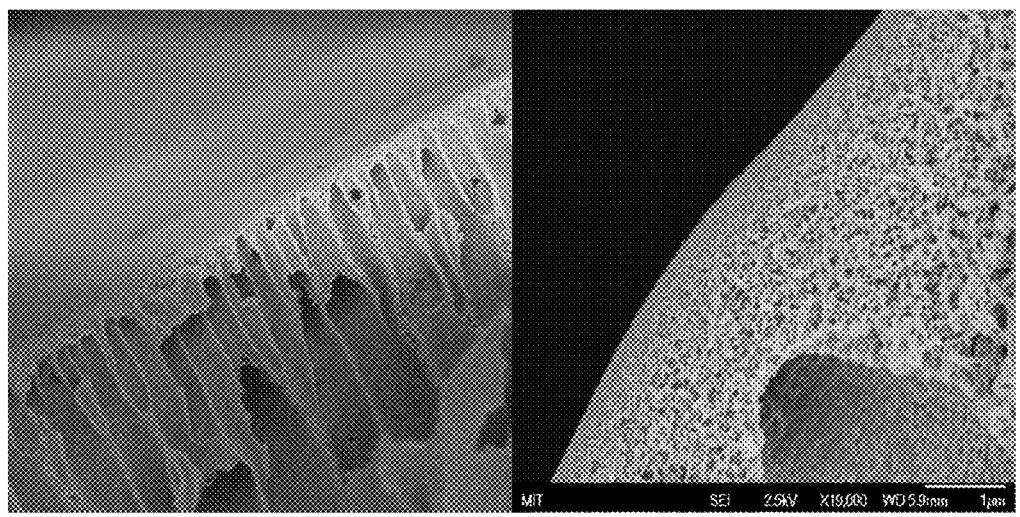
FIG. 11 are SEM images of a 100% PSf membrane in accordance with an illustrative embodiment of the invention.
Figure 12:
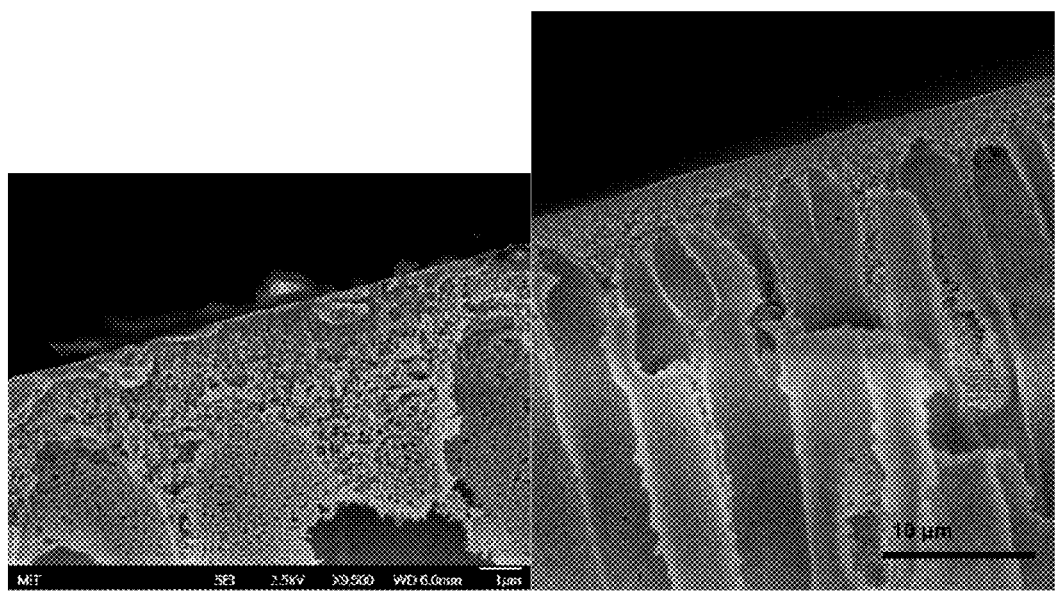
FIG. 12 are SEM images of a 95% PSf, 5% PEG membrane in accordance with an illustrative embodiment of the invention.
Figure 13:
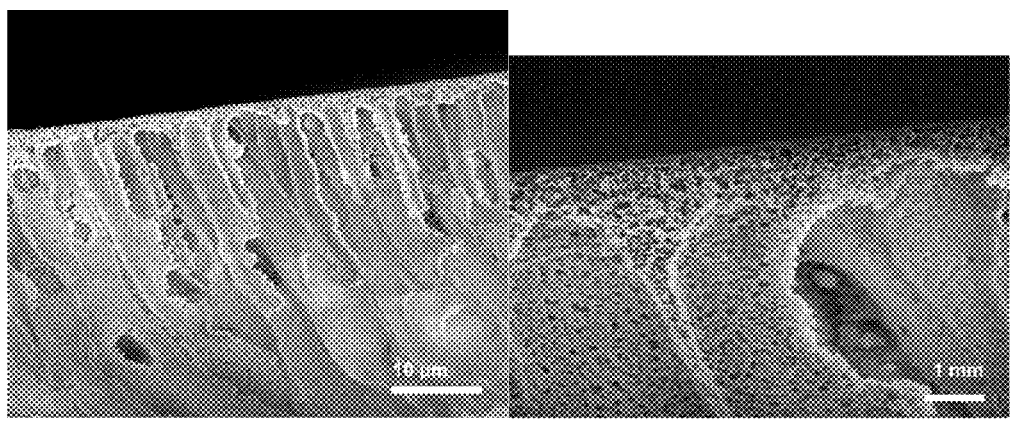
FIG. 13 are SEM images of a 90% PSf, 10% PEG membrane in accordance with an illustrative embodiment of the invention.

FIG. 11 shows SEM images of the 100% PSf membrane, FIG. 12 shows SEM images of the 95% PSf, 5% PEG membrane, and FIG. 13 shows SEM images of the 90% PSf, 10% PEG membrane.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A hierarchical porous membrane suitable for use in oil/water separation processes, wherein the membrane:
   (i) comprises a polymer selected from the group consisting of polycarbonate, polyacrylonitrile (PAN), and a combination thereof;
   (ii) is oleophilic;
   (iii) is hydrophobic;
   (iv) has a first layer with pores comprising a silane coating on the polymer; and
   (v) has a second layer with pores, wherein the second layer is a support layer that is thicker than the first layer, wherein all the pores in the second layer are bigger than all the pores in the first layer,
   wherein the support layer has an average pore size from about 10 microns to about 25 microns.

2. The membrane of claim 1, wherein the first layer has a thickness from about 0.3 micron to about 2 microns.

3. The membrane of claim 1 or 2, wherein the first layer has an average pore size from about 25 nm to about 300 nm.

4. The membrane of any of the preceding claims, wherein the support layer has a thickness from about 55 microns to about 370 microns.

5. The membrane of claim 1, wherein the silane coating comprises at least one member selected from the group consisting of octadecyltrichlorosilane (OTS), methylsilane, phenylsilane, isobutylsilane, dimethylsilane, tetramethyldisilane, hexylsilane, octadecylsilane, and fluorosilane.

6. The membrane of claim 1, wherein the membrane comprises polycarbonate and wherein the membrane has a coating comprising octadecyltrichlorosilane (OTS).

7. The membrane of claim 1, wherein the first layer has a thickness from about 0.5 to about 2.0 microns.

8. The membrane of claim 1, wherein the first layer has an average pore size from about 50 nm to about 200 nm.

9. The membrane of claim 1, wherein the first layer has an average pore size from about 100 nm to about 150 nm.

* * * * *